United States Patent [19]
Reynolds

[11] Patent Number: 4,993,628
[45] Date of Patent: Feb. 19, 1991

[54] RADIATOR HOSE WITH INTERNALLY MOUNTED THERMOSTAT

[76] Inventor: William J. Reynolds, 1410 E. 6th St., #33, Corona, Calif. 91719

[21] Appl. No.: 516,164

[22] Filed: Apr. 30, 1990

[51] Int. Cl.⁵ ............................................. F01P 7/16
[52] U.S. Cl. .................................. 236/34.5; 285/363; 285/921
[58] Field of Search .............................. 236/34, 34.5; 137/454.2; 285/304, 363, 521

[56] References Cited

U.S. PATENT DOCUMENTS

| | | | |
|---|---|---|---|
| 302,343 | 7/1884 | Kitton | 285/363 X |
| 2,214,261 | 9/1940 | Roth | 285/363 X |
| 2,255,159 | 9/1941 | Giesler | 236/34.5 |
| 2,479,034 | 8/1949 | Bolesky | 236/34 |
| 2,919,069 | 12/1959 | Frismuth | 236/34 |
| 3,963,268 | 6/1976 | Widdicombe | 285/921 X |
| 4,327,673 | 5/1982 | Schroeder | 236/34.5 X |
| 4,431,133 | 2/1984 | Roberson, Sr. | 236/34.5 |
| 4,583,499 | 4/1986 | Hovey | 236/34.5 X |

FOREIGN PATENT DOCUMENTS 2653610  6/1977  Fed. Rep. of Germany ..... 236/34.5

Primary Examiner—William E. Tapolcai
Attorney, Agent, or Firm—William L. Chapin

[57] ABSTRACT

An improvement in devices for the thermostatic control of engine coolant comprises a radiator hose with an internally mounted thermostatic valve. In one embodiment of the improved device, a flexible hose has a radially inwardly projecting annular flange on which the radially outwardly projecting annular flange of a conventional thermostatic valve may seat. In another embodiment, the annular flange of a thermostatic valve is modified to permit it to be clamped onto a coil of a helical spring held coaxially within a flexible radiator hose. The improved thermostatic coolant control devices eliminate the requirement for gaskets, gasket cement, and unbolting and bolting metal parts together heretofore required of the replacement of thermostats.

5 Claims, 4 Drawing Sheets

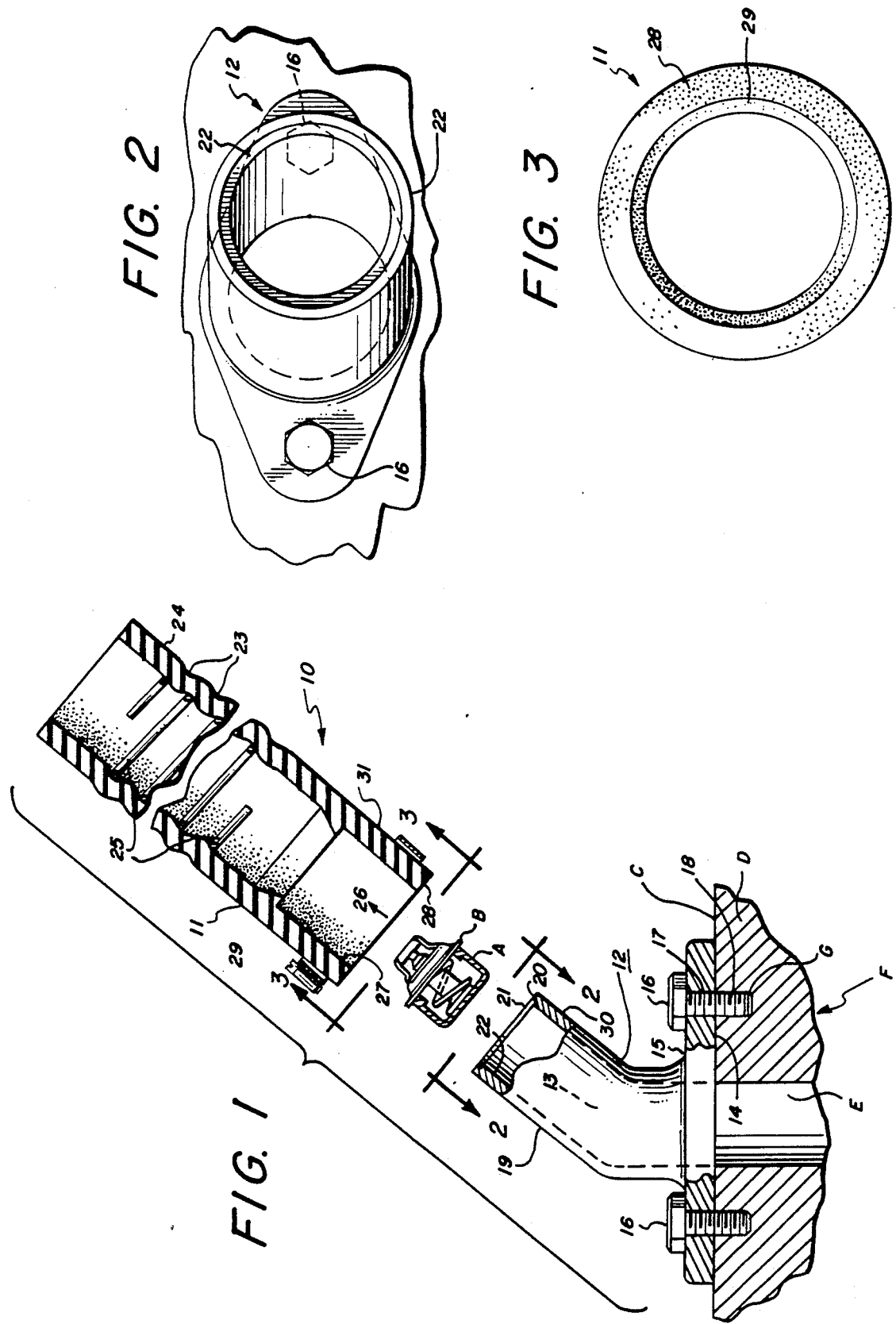

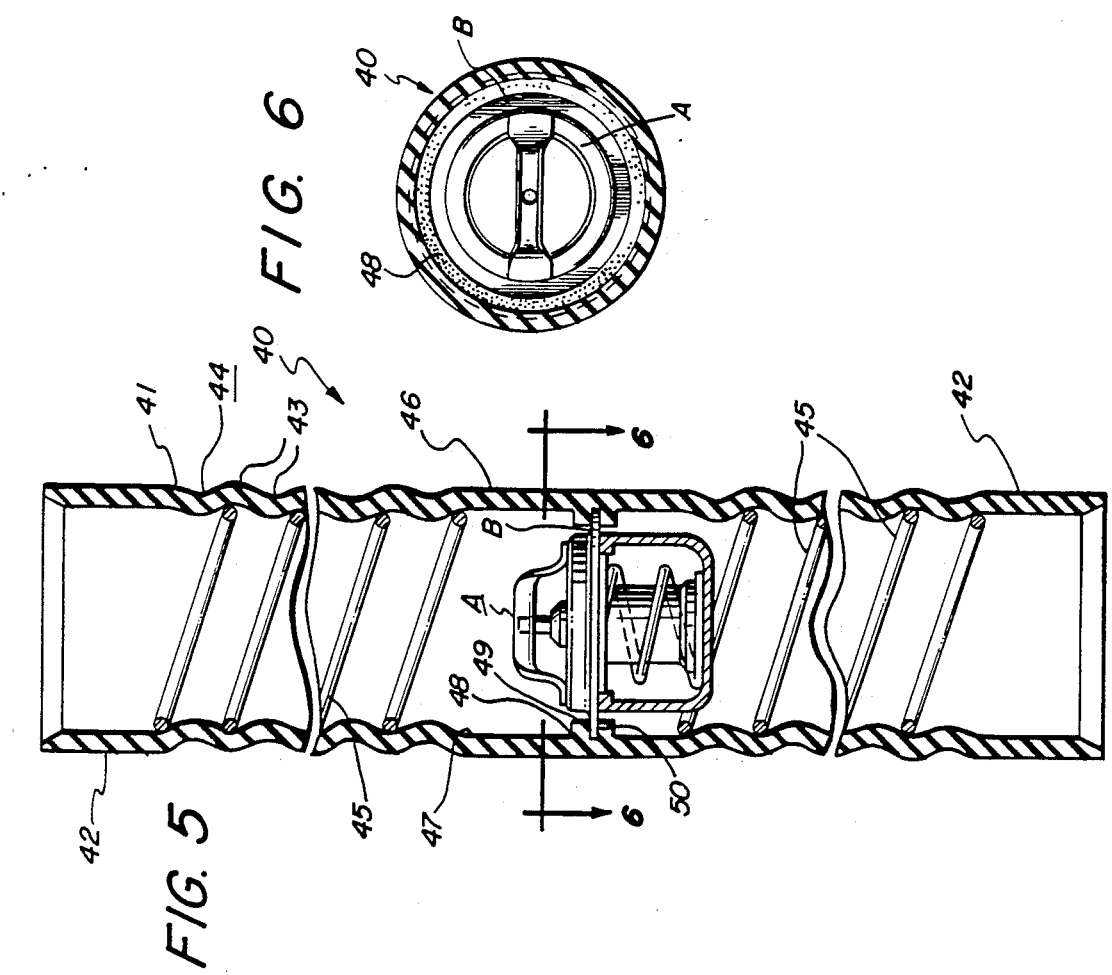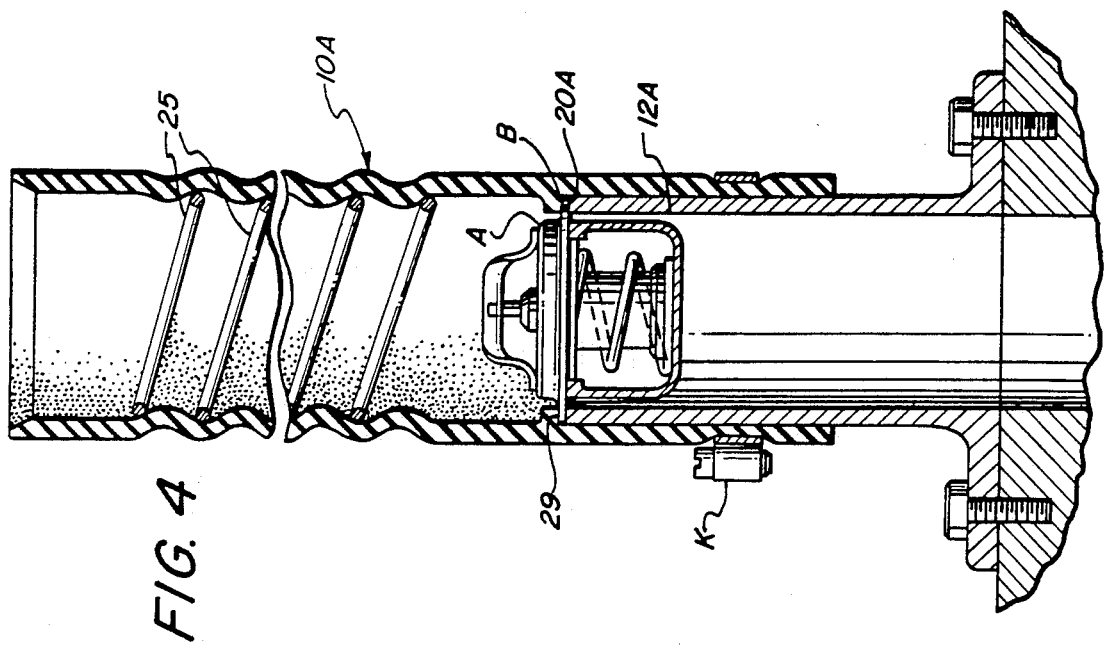

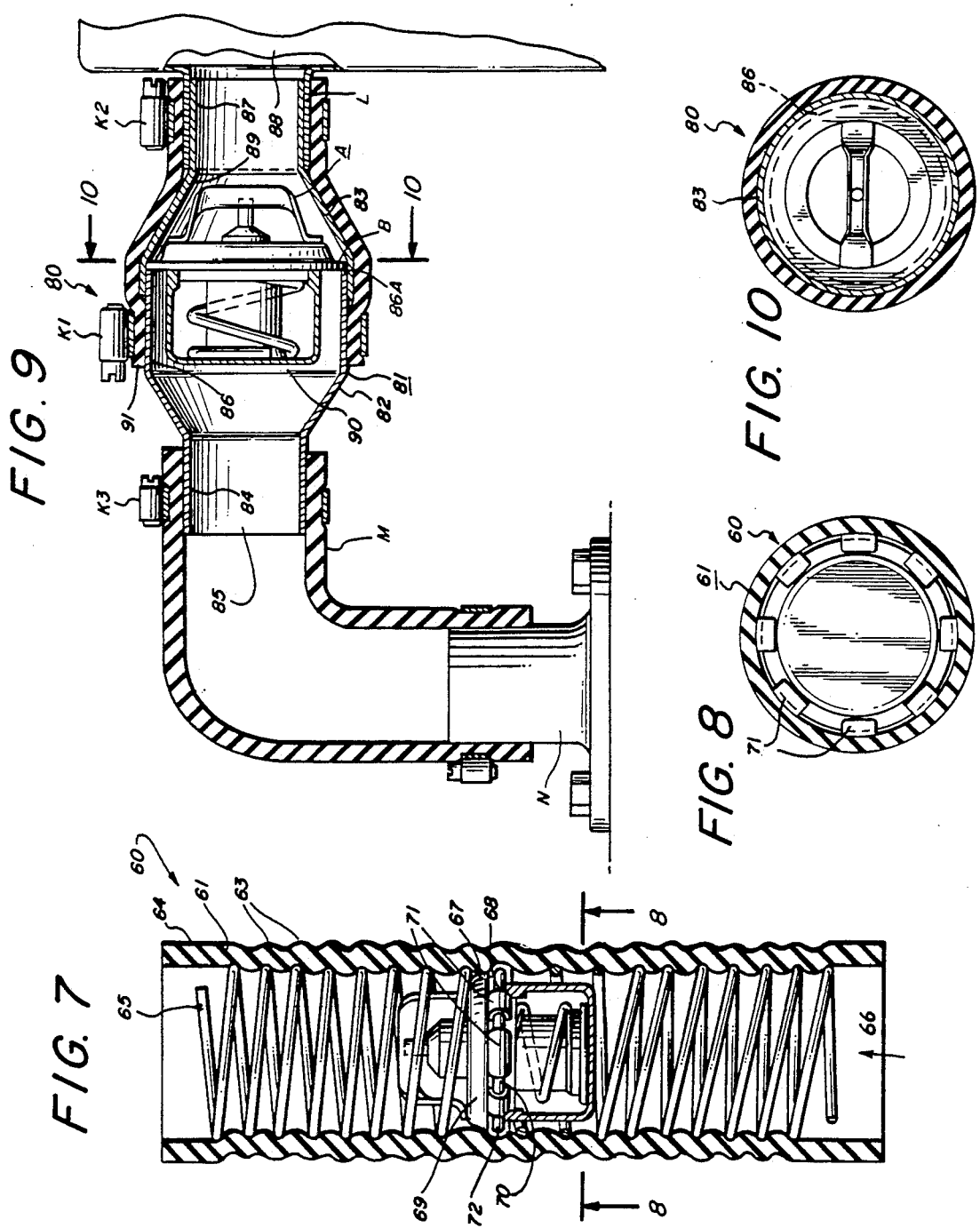

RADIATOR HOSE WITH INTERNALLY MOUNTED THERMOSTAT

BACKGROUND OF THE INVENTION

1. Field of the Invention

This invention relates to devices for controlling the of coolant to internal combustion engines. More particularly, the invention relates to an improvement in the variable control of coolant flow in response to engine temperature changes by means of a thermostat.

2. Description of Background Art

Most motor vehicles use internal combustion engines which are cooled by a closed cycle liquid coolant system. Nearly all such engines employ a temperature sensitive thermostatic valve, commonly referred to as a thermostat, to control the rate of flow of coolant through internal passageways or water cooling jackets within the engine block.

In a typical engine coolant system, liquid coolant absorbs engine heat by passing through internal engine passageways in thermal contact with the combustion chambers of the engine. The heated coolant is pumped from an outlet tube into an air-to-liquid heat exchanger referred to as a radiator. Air drawn through the radiator by means of a rotary fan and/or motion of the vehicle lowers the temperature of the coolant. This coolant then exits the radiator at a lower temperature, and is recirculated to an inlet tube to the engine water jacket system, completing a circuit for the closed loop cooling system.

The operating efficiency and smoothness of typical internal combustion engines is usually relatively poor until the temperature of the engine block has reached a certain minimum value. For typical engines, the coolant temperature at which reasonable engine operating efficiency is to 180° F.

The overall heat transfer capability of the engine's cooling system must be great enough to keep the engine from reaching destructively high temperatures, even when operated under high speed, high load conditions at hot desert temperatures. If this full heat transfer capacity were employed immediately after a cold engine has been started, it would take an excessively long period for the engine to warm up to the proper operating temperature. This is especially true when the engine is started in cold weather.

To enable more rapid warm up of an engine to a proper operating temperature, means were long ago devised and incorporated into engines to inhibit the heat transfer capability of the engine's cooling system during warm up. The most commonly used means for inhibiting initial heat transfer capability and thereby speeding engine warm up is a thermostatic valve or thermostat. The thermostat is usually placed in the engine's coolant outlet tube, directly in contact with the coolant. When the engine is first started cold, the thermostat is in a fully closed position. In this position, no coolant is permitted to flow, in spite of the hydrostatic pressure exerted on the thermostat by the engine's water pump. Thus, the cooling capacity of the system is greatly diminished, permitting the engine and coolant to warm up rapidly.

Thermostats are so constructed that when the temperature of coolant reaches a pre-determined value, a temperature responsive, bimetallic element, evaporating liquid or wax pellet within the thermostat opens a valve, allowing coolant to flow through the thermostat. This opening temperature is usually selected to be 160° F., 180° F., or 212° F.

The failure rate of typical thermostats used in motor vehicle engines is relatively high.

If the thermostat fails in a closed position, engine overheating can occur, especially in warm weather. If the thermostat fails in an open position, the engine can take an excessively long period to reach operating temperatures. In very cold weather, a thermostat which has failed in an open position can prevent the engine from ever reaching a proper operating temperature. Under these circumstances, the coolant temperature will also be too low to properly operate the heater within the driver/passenger compartment, resulting in uncomfortably or dangerously low temperatures there.

Because of the problems caused by a failed thermostat, it is necessary or at least desirable to promptly replace the faulty thermostat. When this must be done in a remote location by the motorist, the replacement process can be troublesome, for the following reasons.

In a typical installation of a thermostat on a motor vehicle engine, the thermostat is positioned within a recess on a cast metal fitting on the upper post of the engine block, and retained therein by a thermostat housing in the form of a mating cast metal tube having a flange bolted to the engine block. A rubber hose clamped around the thermostat tubing connects to the radiator.

Replacing a thermostat conventionally mounted as described above requires use of a wrench to loosen and retighten the bolts, a new thermostat and gasket, and gasket cement to assure a watertight seal is made when bolting the thermostat housing to the engine block.

Even if the owner possesses the proper tools and materials to replace a thermostat, problems can arise when attempting to replace the thermostat. Because the bolt threads and engine block threads are subject to frequent heating and cooling cycles and contact with corrosion-accelerating coolant, the bolt threads frequently become "frozen" to the engine threads, causing a bolt to break off when a large torque is applied to the bolt in an attempt to loosen it. Also, the flat mating planes of the engine block and thermostat housing flange must be carefully scraped clean of adhering pieces of gasket and gasket cement, to ensure an effective seal. This must be done while taking care not to gouge either mating surface.

After installing a new thermostat, care must be taken to seat the thermostat properly in the engine block recess, to properly install the gasket and gasket cement and properly seat the thermostat housing flange with respect to the thermostat and engine block. Finally, the fastening bolts must be installed with sufficient torque so as to insure a liquid-tight seal, but not so tight as to risk shearing off the bolt head.

With the problems with removal and replacement of conventionally mounted thermostats in mind, the present invention was conceived of.

Bolesky, in U.S. Pat. No. 2,479,034, Oct. 12, 1945 discloses a thermostatic valve for insertion in-line between two flexible hoses. The valve has a cylindrical valve chamber made in two telescoping parts of thin-walled metal. A thermostatic valve member in the shape of a helix is contained within the valve chamber.

Friesmuth in U.S. Pat. No. 2,996,254, Aug. 15, 1961 discloses a pellet-type thermostat having an enlarged circular flange clampingly engaged in an annular recess formed between a lower housing and upper housing.

None of the prior art developments in the field of automotive thermostats addresses the specific problem of providing a thermostat which simplifies the replacement of worn-out thermostats.

OBJECT OF THE INVENTION

An object of the present invention is to provide an improved radiator thermostat for motor vehicles which is more convenient to remove and install than prior art thermostats.

Another object of the invention is to provide a thermostat for vehicles which is mountable within a flexible radiator hose Another object of the invention is to provide a radiator thermostat which includes a flexible hose containing a thermostat.

Another object of the invention is to provide a flexible hose in which a conventional flanged thermostat may be mounted.

Various other objects and advantages of the present invention, and its most novel features, will be particularly pointed out in this disclosure.

It is to be understood that although the invention disclosed herein is fully capable of achieving the objects and providing the advantages mentioned, the structural and operational characteristics of the invention described herein are merely illustrative of the preferred embodiments. Accordingly, I do not intend that the scope of my exclusive rights and privileges in the invention be limited to the details of construction and operation described. I do intend that reasonable equivalents, adaptations and modifications of the invention described herein be included within the scope of the invention as defined by the appended claims.

SUMMARY OF THE INVENTION

Briefly stated, the present invention comprehends an improvement in thermostats intended for use in internal combustion engines.

In a basic embodiment of the invention, a novel radiator hose contains an internally mounted thermostatic valve of conventional construction. The hose contains an inwardly projecting annular flange against which the outwardly projecting, annular flange of a conventional thermostat seats. This novel construction eliminates the requirement of bolting two flanged metal parts together to retain a thermostat in a required position.

Another embodiment of the hose-mounted radiator thermostat according to the present invention employs a thermostat with an annular flange which is modified to clamp onto a coil of a helical spring contained coaxially within a flexible radiator hose, thereby permitting the modified thermostat to be retained within the hose.

BRIEF DESCRIPTION OF THE DRAWINGS

FIG. 1 is an exploded elevation view, partially in section, of a basic embodiment of a radiator thermostat hose according to the present invention.

FIG. 2 is an upper plan view of part of the apparatus of FIG. 1, taken in the direction 2—2.

FIG. 3 is a bottom plan view of another part of the apparatus of FIG. 1, taken in the direction 3—3.

FIG. 4 is a longitudinal sectional view of the apparatus of FIG. 1, shown installed on an engine head fitting.

FIG. 5 is an elevation view partially in longitudinal section, of a second embodiment of a radiator thermostat hose according to the present invention.

FIG. 6 is a transverse sectional view of the apparatus of FIG. 5, taken along the line 6—6.

FIG. 7 is an elevation view, partially in longitudinal section, of a third embodiment of a radiator thermostat hose according to the present invention.

FIG. 8 is a transverse sectional view of the apparatus of FIG. 7, taken along the line 8—8.

FIG. 9 is an elevation view, partially in longitudinal section, of a fourth embodiment of a radiator thermostat hose according to the present invention.

FIG. 10 is a transverse sectional view of the apparatus of FIG. 9, taken along the line 10—10.

DETAILED DESCRIPTION OF THE INVENTION

Figure 11:
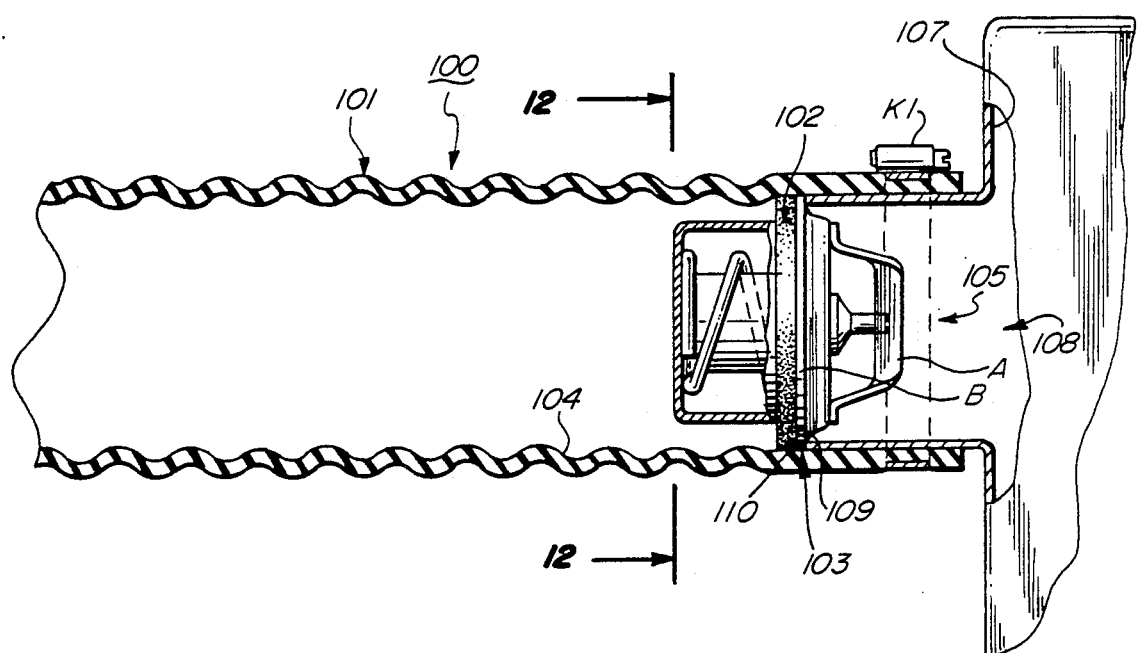
FIG. 11 is a longitudinal sectional view of a fifth embodiment of a radiator thermostat hose according to the present invention.

Referring now to FIGS. 1 through 3, a basic embodiment 10 of a radiator thermostat hose according to the present invention is shown.

The radiator thermostat hose 10 shown in FIGS. 1 and 2 includes a flexible hose section 11, a conventional thermostat A having an annular mounting flange B, and a rigid gooseneck assembly 12.

As may be seen best by referring to FIG. 1, the gooseneck assembly 12, which is preferably made of cast metal, is mounted onto the surface C of an engine component D, such as a cylinder head. The engine component D has a bore E which communicates with internal coolant passageways within an engine F, not shown. Gooseneck assembly 12 has an internal bore 13 which communicates with bore E of the engine component D, and has a flat lower face 14 which mates with the flat upper surface C of the engine component. The gooseneck assembly 12 has at its base 15 radially outwardly projecting mounting lugs 16. Mounting lugs 16 are provided through their thickness dimension with bores 17 adapted to receive bolts 18 threadable into blind holes G in engine component D.

As shown in FIGS. 1 and 2, the gooseneck assembly 12 has an elongated, circular transverse cross section upper neck portion 19 which extends upward at an acute angle from the base 15 of the gooseneck assembly. The bore 13 of the gooseneck assembly which extends coaxially inwards from the lower face 14 of the base 15 of the gooseneck assembly 12 extends continuously and coaxially through the angled upper neck portion 19 of the gooseneck assembly, extending outward through the outer face 20 of the neck portion. Bore 13 is counterbored a short distance inwards from the outer face 20 to form an annular recess 21 having an inner shoulder 22. The annular recess 21 is of the proper diameter and depth to snugly receive the annular mounting flange section B of a standard thermostat A.

As may be seen best by referring to FIGS. 1 and 3, the radiator thermostat hose 10 includes a flexible hose section 11. Hose section 11 is preferably fabricated from the same materials as conventional radiator hoses, typically, synthetic rubber reinforced with integral fabric cords. Hose section 11 may include convolutions 23, of the type frequently included in conventional radiator hoses, in a portion of its cylindrical wall 24, to increase the bendability of the hose. Also, hose section 11 may contain an internal helical spring 25 within the convoluted portion of the hose. The purpose of the spring 25 is to provide an outwardly radially directed resistance force preventing the collapse of the hose under negative pressurization, which occasionally occurs in conventional cooling systems.

The bore 26 through hose section 11 contains a counterbored recess 27, of larger diameter then that of the bore, which extends a substantial distance inwards from a lower face 28 of the hose section. The counterbored recess 27 terminates at its inner longitudinal extension in an annular shoulder 29. The diameter of the counterbored recess is of the proper dimension to snugly receive the outer circumferential surface 30 of the upper neck section 19 of the gooseneck assembly 12.

The inner diameter of the annular shoulder 29 at the bottom of counterbored recess 27 is just slightly greater than the diameter of the body of thermostat A, and therefore, less than the outer diameter of the annular central mounting flange B of the thermostat. Thus, when the lower portion of flexible hose section 11 of the radiator thermostat hose 10 is slid sufficiently far down over the upper neck portion 19 of the gooseneck assembly 12, the outer portion of annular shoulder 29 abuts the annular upper wall 20 of the neck portion, limiting further downward movement of the hose section relative to the gooseneck assembly.

With the flexible hose section 12 installed on the gooseneck assembly as described above, the inner portion of the annular shoulder 29 abuts the upper surface of the annular mounting flange B of the thermostat A, securing the mounting flange within the annular entrance recess 21 in the bore 13 in the upper neck portion 19 of the gooseneck assembly 12. Thermostat A is thus secured against longitudinal movement by the annular flange B of the thermostat being abutted on its lower surface by the shoulder 22 of gooseneck assembly 12, and on its upper surface by the shoulder 29 of the flexible hose assembly. To complete installation of a thermostat A within gooseneck assembly 12 and hose section 11, a standard radiator hose clamp K is tightened around the outer circumferential surface 31 of that lower portion of the flexible hose section 11 overlying the upper neck 19 of gooseneck assembly.

The novel radiator thermostat hose assembly described above greatly simplifies the removal and replacement of a defective thermostat, or by one having a different transition temperature. Removal and replacement is accomplished by simply loosening the standard hose clamp with a screwdriver, pulling the flexible hose assembly off the neck of the gooseneck assembly, pulling out the old thermostat and inserting a new one, sliding the hose assembly over the gooseneck, and re-tightening the hose clamps.

FIG. 4 illustrates a modification of the radiator thermostat hose illustrated in FIGS. 1 through 3 described above. In the modified radiator thermostat hose 10A, the flexible hose section 11 and thermostat A are identical to those described for the basic embodiment 10. However, the rigid gooseneck assembly for attachment to the engine is replaced by an engine head fitting 12A which does not have a counterbored upper entrance. In the embodiment 10A, flange B of thermostat A rests directly on the upper annular wall 20A of engine head fitting 12A.

FIGS. 5 and 6 illustrate a second embodiment 40 of a novel radiator thermostat hose according to the present invention.

The radiator thermostat hose 40 includes a flexible hose 41, preferably fabricated of materials commonly used to fabricate conventional radiator hoses, i.e., a fabric cord matrix in molded rubber. The hose 40 has two identical end sections 42 of the proper inner diameter to fit over an engine water outlet tube and a radiator inlet tube. The end sections 42 of flexible hose 41 may include in the cylindrical wall 44 thereof convolutions 43 to increase the bendability of the hose. Also, hose sections 41 may contain an internal helical spring 45, to resist collapse of the hose when the internal pressure of the hose is less than atmospheric pressure.

Flexible hose 41 contains an enlarged diameter central section 46 of modest length. The inner cylindrical wall 47 of the central section 46 has a radially inwardly projecting annular flange section 48. The flange section 48 has a relatively short longitudinal extent, and has an inner facing, longitudinally disposed wall 49 coaxial with the outer wall 44 of the hose 41. Flange 48 is positioned longitudinally midway between the ends of enlarged central section 46 of hose 41.

A thin, annular groove 50 extends radially outward from the inner wall 49 of annular flange 48. The inner diameter of annular flange 48 is slightly greater than the outer body diameter of a standard thermostat A. Annular groove 50, which is positioned longitudinally midway between the ends of annular flange 48, is sufficiently narrow to form a tight fit with the upper and lower surfaces of the annular mounting flange B of thermostat A. Therefore, with thermostat A installed in flexible hose 41 as described and illustrated in FIGS. 4 and 5, the radiator thermostat hose 41 may be conveniently connected between the coolant outlet tube of an engine and the radiator inlet tube. Thus, thermostat A in hose 41 may be replaced by loosening standard radiator hose clamps K, removing hose 41 and replacing it with a hose assembly containing a new thermostat A, and re-tightening the hose clamps K at both ends of the hose.

A third embodiment of a radiator thermostat hose according to the present invention is shown in FIGS. 7 and 8.

The radiator thermostat hose 60 shown in FIGS. 7 and 8 includes a conventional flexible radiator hose 61. Hose 61 has convolutions 63 in its cylindrical wall 64, and contains an internal helical spring 65. The inner diameter of the bore 66 through hose 61 is of the proper size to fit snugly over the outer circumferential surface of a conventional engine coolant outlet tube, or radiator inlet tube.

Contained coaxially within flexible hose 61 of radiator thermostat hose 60 is a thermostat 67. Thermostat 67 has the general construction of cylindrical in-line pellet thermostats with an annular mounting flange 68 extending radially outward from the body 69 of the thermostat. However, annular mounting flange 68 is modified by the addition of rectangular plan view notches 70 extending radially inwards from the outer circumferential edge of the mounting flange. Notches 70 are spaced at regular circumferential internals around the periphery of the annular mounting flange 68.

Providing notches 70 in the annular flange 68 results in a plurality of generally rectangular plan view tabs 71 extending radially outward from the circle on the annular flange defining the inner edge of the notches. Tabs 71 are bent around a coil 72 of helical spring 65, thereby securing thermostat 67 to the spring, in fixed relationship to the flexible hose 61.

As in the second embodiment of the radiator thermostat hose described above, radiator thermostat hose 60 comprising a flexible hose 61 containing an internally mounted thermostat 67 may be readily removed and replaced between the engine coolant outlet tube and radiator inlet tube of an engine, simply by loosening and retightening standard radiator hose clamps K at both ends of the flexible hose 61.

A fourth embodiment 80 of a radiator thermostat hose according to the present invention is shown in FIGS. 9 and 10.

The radiator thermostat hose 80 shown in FIGS. 9 and 10 is useable as a replacement for the existing radiator hose and thermostat of an engine. As shown in the Figures, radiator thermostat hose 80 includes a metal housing 81 formed of two circularly symmetric tubular sections, an inlet section 82 and an outlet section 83. Inlet section 82 has a generally cylindrical beginning or end section 84 which has an open end 85. The end section 82 tapers smoothly and continuously outward to a larger diameter end section 86, which larger diameter end section has a generally cylindrical shape. The outlet section 83 of metal housing 81 has a shape which is the mirror image through the transverse mid plane of the housing of inlet section 82 Thus, outlet section 83 has a small diameter cylindrical end section 87 which has an opening 88, and which flares outward to a larger diameter end section 89. The outer diameter of the larger diameter end portion 86 of inlet section 82 is slightly less than the inner diameter of the larger diameter end portion of 89 of outlet section 83, permitting the larger diameter end portion of the inlet section to be inserted into the larger diameter end portion of the outlet section, forming a cylindrical space 90 for holding a thermostat A. The front annular wall surface 86A of inlet section 86 comprises a seating surface for the annular flange B of thermostat A.

A flexible hose section 91 overlying the metal housing 81 and extending longitudinally from the inlet end of the cylindrical space 90 to the opening 88 in the outlet section 83 of the housing is secureable by a standard hose clamp K1 around the housing. A second hose clamp K2 is used to clamp the smaller diameter end portion of the hose section 91 circumferentially around the inlet tube L of a radiator.

A third hose clamp K3 is used to clamp a standard radiator hose section M around the inlet end section 82 of metal housing 81. A fourth hose clamp K4 is used to clamp the opposite end of radiator hose section M around a standard engine head fitting N. Thus, after having first removed a faulty installing the fitting, radiator thermostat hose may thereafter used to replace the discarded thermostat, while requiring only the use of a screwdriver to loosen and retighten four hose clamps.

Figure 12:
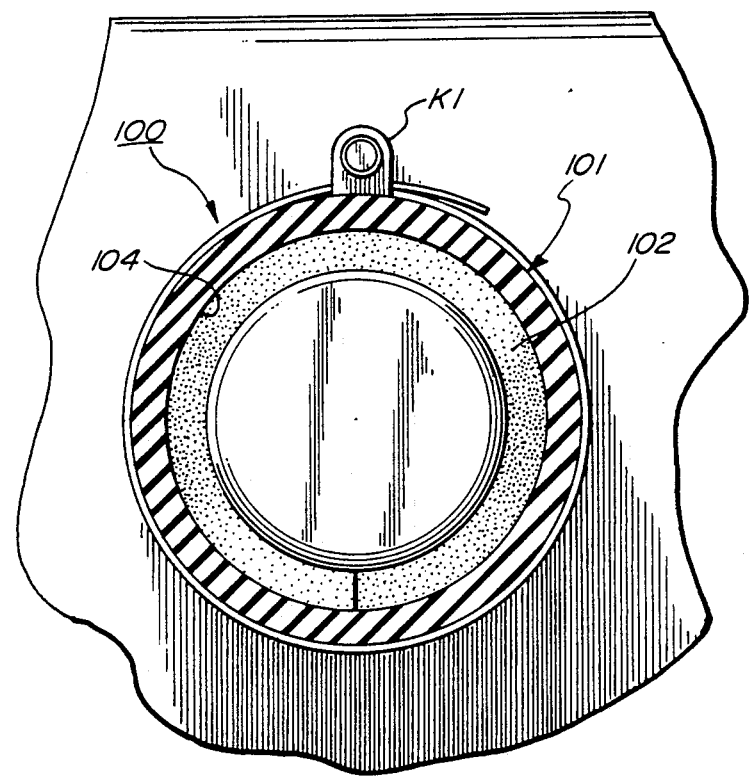
FIG. 12 is a left end view of the apparatus of FIG. 11.

A fifth embodiment 100 of a radiator thermostat hose according to the present invention is shown in FIGS. 11 and 12. This embodiment may be produced using existing radiator hoses.

As shown in FIGS. 11 and 12, the radiator thermostat hose 100 includes a conventional flexible radiator hose 101 that has been modified by inserting into the hose a coaxial annular grommet 102, made of a flexible material such as rubber. The outer cylindrical wall surface 103 of the grommet 102 is bonded to the inner cylindrical wall surface 104 of the hose 101. Bonding may be accomplished by many suitable means, such as applying a coat of adhesive to either or both surfaces 103 and 104 before inserting the grommet 102 into the hose 101.

As may be seen best by referring to FIG. 11, the grommet 102 is positioned longitudinally inwards from an outer end 105 of hose 101 a distance slightly smaller than the length of the inlet tube 106 protruding from a radiator 107. Thus, a thermostat A having an annular flange B may be inserted into the open end 108 of hose 101 and pushed axially within the tube until the bottom annular surface of the annular flange seats on the outer annular wall surface 109 of grommet 102. The inlet tube 106 of radiator 107 may then be inserted into the open end 108 of hose 101, and the hose pushed axially towards the radiator until the outer annular wall surface 110 of the inlet tube contacts the upper annular surface of annular flange B of thermostat A. The hose 101 may then be clamped to the radiator inlet tube 106 by conventional means, such as by a hose clamp K. Thus, thermostat A will be clamped in a fixed position within hose 101, being clamped between the inlet tube and the grommet 102.

What is claimed is:

1. A temperature responsive fluid control apparatus for use with thermostatic valves of the type having a substantially cylindrical non-concave body portion and a thin radially outwardly projecting annular flange section of generally uniform thickness, said flange being longitudinally positioned between opposite transverse ends of said thermostatic valve, and said flange being of larger diameter than said body portion of said thermostatic valve, said apparatus affording means for replacing a thermostatic valve of said type normally retained between bolted-together mating metal engine fittings by the same type of thermostatic valve subsequently replaceable without the requirement for removing and installing bolts into said matching metal engine fittings, said apparatus comprising:
   (a) an elongated flexible tube made of resilient material and having a generally circular cross-sectional shape, and
   (b) means for retaining said thermostatic valve in a fixed longitudinal position within said tube, said means comprising an annular shoulder flange which projects radially inwards from and is integral with the inner wall of said tube, said shoulder flange having an inner cylindrical wall with a circular opening of larger diameter than the diameter of said body portion of said thermostatic valve and of smaller diameter than the outer diameter of said annular flange of said thermostatic valve, said shoulder flange further having a thin, annular groove extending radially outward from the inner cylindrical wall of said shoulder flange for receiving said annular flange of said thermostatic valve, whereby said body of said thermostatic valve may be inserted axially through said opening of said annular shoulder flange to seat said annular flange of said valve on said annular shoulder flange.

2. The apparatus of claim 1 wherein said tube has a continuous, unsegmented outer wall surface.

3. The apparatus of claim 2 wherein said tube is a unitary structure.

4. The apparatus of claim 3 wherein said tube and said means for retaining said thermostatic valve comprise a one-piece structure.

5. The apparatus of claim 3 wherein the mean outer diameter of said tube has a uniform value.

* * * * *